(12) United States Patent
Armstrong et al.

(10) Patent No.: US 7,937,616 B2
(45) Date of Patent: May 3, 2011

(54) CLUSTER AVAILABILITY MANAGEMENT

(75) Inventors: William Joseph Armstrong, Rochester, MN (US); Michael Howard Hartung, Tucson, AZ (US); Yu-Cheng Hsu, Tucson, AZ (US); Glenn Rowan Wightwick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 11/168,973

(22) Filed: Jun. 28, 2005

(65) Prior Publication Data
US 2007/0011495 A1     Jan. 11, 2007

(51) Int. Cl.
G06F 11/00 (2006.01)

(52) U.S. Cl. ............ 714/13; 714/6; 714/7; 714/10; 714/11; 714/12

(58) Field of Classification Search ........... 714/6–7, 714/10–13
See application file for complete search history.

(56) References Cited

U.S. PATENT DOCUMENTS

| | | | |
|---|---|---|---|
| 4,371,754 A * | 2/1983 | De et al. .................. | 714/10 |
| 5,359,730 A | 10/1994 | Marron | |
| 5,696,895 A * | 12/1997 | Hemphill et al. .......... | 714/4 |
| 5,919,247 A | 7/1999 | Van Hoff et al. | |
| 5,940,612 A | 8/1999 | Brady et al. | |
| 6,189,145 B1 | 2/2001 | Bellin, Jr. et al. | |
| 6,199,179 B1 * | 3/2001 | Kauffman et al. ......... | 714/26 |
| 6,279,046 B1 | 8/2001 | Armstrong et al. | |
| 6,363,495 B1 | 3/2002 | MacKenzie et al. | |
| 6,378,021 B1 * | 4/2002 | Okazawa et al. .......... | 710/317 |
| 6,421,679 B1 | 7/2002 | Chang et al. | |
| 6,460,039 B1 | 10/2002 | Pinter et al. | |
| 6,463,584 B1 * | 10/2002 | Gard et al. ................ | 717/171 |
| 6,598,069 B1 | 7/2003 | Rooney et al. | |
| 6,622,265 B1 * | 9/2003 | Gavin ...................... | 714/38 |
| 6,643,843 B1 | 11/2003 | Reger | |
| 6,745,312 B1 | 6/2004 | Schnee et al. | |
| 6,754,656 B1 | 6/2004 | Cornwell et al. | |
| 6,898,705 B2 | 5/2005 | Abboud et al. | |
| 6,944,785 B2 | 9/2005 | Gadir et al. | |
| 6,944,788 B2 * | 9/2005 | Dinker et al. ............. | 714/4 |

(Continued)

FOREIGN PATENT DOCUMENTS

CN         1554055 A     12/2004

OTHER PUBLICATIONS

C.W. Symborski, "Updating Software and Configuration Data in a Distributed Communications Network", IEEE, 1988, pp. 331-338.

(Continued)

*Primary Examiner* — Scott T Baderman
*Assistant Examiner* — Loan Truong
(74) *Attorney, Agent, or Firm* — William K. Konrad; Konrad Raynes & Victor LLP

(57) ABSTRACT

A first logical partition in a first processing complex of a server cluster is operated in an active mode and a second logical partition in the processing complex is operated in a standby mode. Upon detection of a failure in a second processing complex of the server cluster, the standby mode logical partition in the first processing complex is activated to an active mode. In one embodiment, partition resources are transferred from an active mode logical partition to the logical partition activated from standby mode. Other embodiments are described and claimed.

18 Claims, 4 Drawing Sheets

U.S. PATENT DOCUMENTS

| | | | |
|---|---|---|---|
| 6,973,654 B1 * | 12/2005 | Shutt et al. ..................... 718/105 |
| 6,976,079 B1 | 12/2005 | Ferguson et al. | |
| 6,990,660 B2 | 1/2006 | Moshir et al. | |
| 7,051,327 B1 | 5/2006 | Milius et al. | |
| 7,055,149 B2 | 5/2006 | Birkholz et al. | |
| 7,117,393 B2 * | 10/2006 | Baba et al. ..................... 714/25 |
| 7,158,248 B2 | 1/2007 | Smith et al. | |
| 7,200,847 B2 | 4/2007 | Straube et al. | |
| 7,213,065 B2 | 5/2007 | Watt | |
| 7,222,339 B2 | 5/2007 | Rothman et al. | |
| 7,225,356 B2 * | 5/2007 | Monitzer ..................... 714/12 |
| 7,237,239 B1 | 6/2007 | Goel et al. | |
| 7,246,256 B2 * | 7/2007 | De La Cruz et al. .............. 714/4 |
| 7,412,545 B2 * | 8/2008 | Boutcher et al. ................ 710/36 |
| 7,500,234 B2 | 3/2009 | Hatasaki | |
| 7,711,983 B2 * | 5/2010 | Hatasaki et al. ................ 714/13 |
| 2002/0010844 A1 | 1/2002 | Noel et al. | |
| 2002/0099756 A1 | 7/2002 | Catthoor et al. | |
| 2002/0156824 A1 | 10/2002 | Armstrong et al. | |
| 2003/0084372 A1 | 5/2003 | Mock et al. | |
| 2003/0115442 A1 | 6/2003 | Whitney | |
| 2003/0177325 A1 | 9/2003 | Jann et al. | |
| 2003/0182546 A1 * | 9/2003 | Suzuki et al. ..................... 713/1 |
| 2003/0217088 A1 * | 11/2003 | Takamoto ........................ 709/1 |
| 2004/0158834 A1 * | 8/2004 | Ham et al. .................... 718/104 |
| 2004/0168170 A1 * | 8/2004 | Miller ........................... 718/104 |
| 2004/0210890 A1 | 10/2004 | Armstrong et al. | |
| 2004/0221193 A1 * | 11/2004 | Armstrong et al. ............. 714/10 |
| 2005/0005200 A1 * | 1/2005 | Matena et al. ................... 714/38 |
| 2005/0283658 A1 * | 12/2005 | Clark et al. ..................... 714/11 |
| 2005/0289390 A1 * | 12/2005 | Baba ............................... 714/11 |
| 2006/0224854 A1 * | 10/2006 | Nakamura ..................... 711/173 |
| 2006/0294323 A1 * | 12/2006 | Armstrong et al. ........... 711/153 |

OTHER PUBLICATIONS

C. Boyapati, et al., "Lazy Modular Upgrades in Persistent Object Stores", ACM, 2003, pp. 403-417.

T. van der Storm, "Continuous Release and Upgrade of Component-Based Software", ACM, 2005, pp. 43-57.

O. Crameri et al., "Staged Deployment in Mirage, an Integrated Software Upgrade Testing and Distribution System", ACM, 2007, pp. 221-236.

Office Action dated Apr. 29, 2009 for U.S. Appl. No. 11/169,252, filed Jun. 28, 2005.

NOA dated Oct. 20, 2009 for U.S. Appl. No. 11/169,252, filed Jun. 28, 2005.

Office Action dated Sep. 23, 2009 for U.S. Appl. No. 11/169,251, filed Jun. 28, 2005.

Second NOA dated Feb. 5, 2010 for U.S. Appl. No. 11/169,252, filed Jun. 28, 2005.

Summary of Art Cited in Counterpart Chinese Office Action dated Dec. 10, 2007.

* cited by examiner

CLUSTER AVAILABILITY MANAGEMENT

BACKGROUND

1. Field of the Invention

The present invention relates to management of a cluster in the event of a failure.

2. Description of Related Art

In certain computing environments, multiple host systems may communicate with a control unit, such as an IBM Enterprise Storage Server (ESS)®, for data in a storage device managed by the ESS receiving the request, providing access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit, also known as a cluster, may include duplicate and redundant processing nodes, also known as processing complexes, to allow for failover to a surviving processing complex in case one fails. The processing complexes may access shared resources such as input/output (I/O) adapters, storage adapters and storage devices.

In the event a processing complex fails due to a hardware or software failure, the surviving processing complex detects the failure and takes control of all shared resources of the cluster. The processing duties which were being performed by the processing complex which failed are taken over by the surviving processing complex.

The resources of each processing complex may be divided into a number of logical partitions (LPAR), in which a computer's processors, memory, and hardware resources are divided into multiple environments. Each environment can be operated independently, with its own operating system and applications. Logical partitioning of a processing complex adds flexibility in workload management on a single server, with the ability to partition the single machine into many logical servers with their own sets of system resources. The resources in each partition may be combined in various amounts and combinations. Also, the number of logical hardware partitions that can be created depends on the hardware system.

Dynamic Logical Partitioning (DLPAR) extends the capability of LPAR by providing the ability to logically attach and detach the resources of a processing complex to and from the operating system of a logical partition without rebooting. This resource allocation can occur not only when activating a logical partition, but also while the partitions are running. Processor, memory, I/O adapter and other partition resources can be released into a "free pool," acquired from that free pool, or moved directly from one partition to another within a processing complex, in various amounts or combinations. However, each partition generally has at least one processor, memory, an I/O adapter associated with a boot device, and a network adapter.

The movement of an LPAR resource from one hardware partition to another within a processing complex may be managed by a supervisor module. To transfer a partition resource, the supervisor module can send a network request to the logical partition which "owns" the partition resource, asking that source logical partition to release the particular partition resource and put it into a quiesced state. In this manner, the partition resource is stopped, and placed under control of a hypervisor module. The supervisor module can send a command to the hypervisor, instructing it to reallocate the partition resource from the source logical partition to a target logical partition. In addition, the supervisor module can send a network request to the target logical partition, instructing it to acquire the partition resource from the hypervisor module and configure it for use by the target logical partition.

SUMMARY

A first logical partition in a first processing complex of a server cluster is operated in an active mode and a second logical partition in the processing complex is operated in a standby mode. Upon detection of a failure in a second processing complex of the server cluster, the standby mode logical partition in the first processing complex is activated to an active mode. In one embodiment, partition resources are transferred from an active mode logical partition to the logical partition activated from standby mode. Input/output or other processing operations may be performed by both logical partitions in the surviving processing complex to provide redundancy until the other processing complex is repaired and reactivated. Other embodiments are described and claimed.

DETAILED DESCRIPTION

Figure 1:
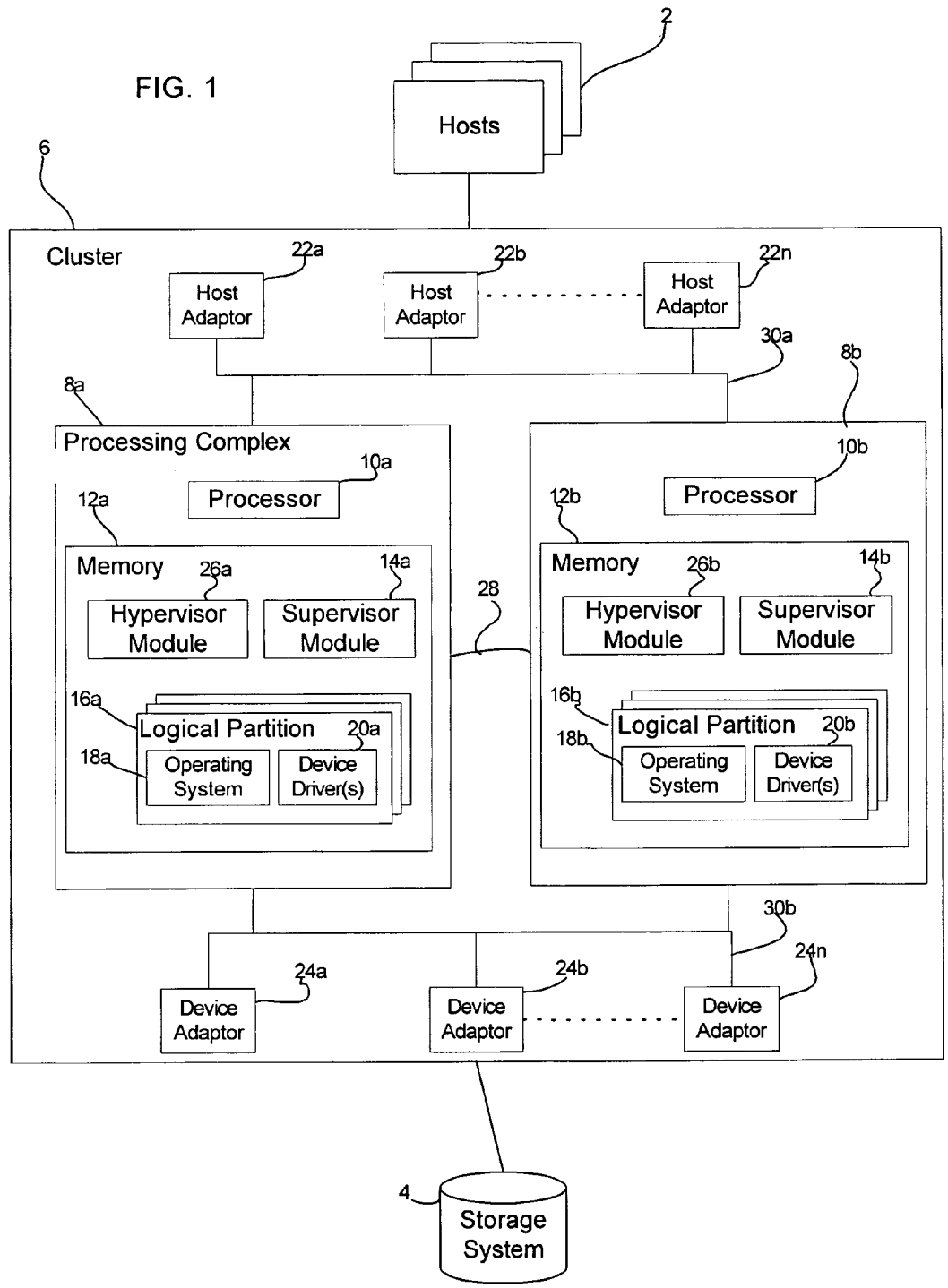
FIG. 1 illustrates a computing environment in which embodiments may be implemented.

FIG. 1 illustrates one example of a computing environment in which aspects of the present description may be employed. One or more hosts 2 communicate Input/Output (I/O) requests directed to a storage system 4 to a control unit or cluster 6, where the cluster 6 manages access to the storage system 4. In one embodiment, the cluster 6 is comprised of two processing nodes or complexes 8a, 8b, each including a processor 10a, 10b and a memory 12 12a. Each processor 10a, 10b can include a number of central processing units available as processing resources to the associated processing complex 8a, 8b.

Each processing complex 8a, 8b includes a supervisor module 14a, 14b. The supervisor modules 14a, 14b comprise code that manage and coordinate the operations of one or more logical partitions 16a, 16b executing in the processing complexes 8a, 8b. Each logical partition 16a, 16b separately executes an operating system 18a, 18b and device drivers 20a, 20b. The logical partitions comprise a division of the processors 10a, 10b into logical independent processing systems each having their own operating systems 18a, 18b and device drivers 20a, 20b. Multiple logical partitions may execute in each processing complex, managed by the supervisor module for that complex.

Each device driver 20a, 20b provides an interface between the operating system 18a, 18b, in the logical partition 16a, 16b in which the device driver 20a, 20b executes, and an external device, such as host adaptors 22a, 22b . . . 22n and device adaptors 24a, 24b . . . 24n. The host adaptors 22a, 22b . . . 22n enable the processing complexes 8a, 8b to communicate with the hosts 2 and the device adaptors 24a, 24b . . .

24n enable the processing complexes 8a, 8b to communicate with the storage system 4. Thus, the processing complexes 8a, 8b share devices, such as adaptors 22a, 22b . . . 22n, 24a, 24b . . . 24n. The variable "n" is used to denote an integer instance of an element, and may indicate different or the same integer value when used with different elements. For instance, 22n and 24n may indicate a same or different number of host adaptors 22n and device adaptors 24n.

The processing complexes 8a, 8b communicate with the host adaptors 22a, 22b . . . 22n over a fabric 30a and the device adaptors 24a, 24b . . . 24n over a fabric 30b. The fabrics 30a, 30b may comprise one or more interfaces providing communication paths between the processing complexes 8a, 8b and adaptors. A path comprises the hardware in the fabrics 30a, 30b that enables communication with shared adaptors over the fabric. In one embodiment, the fabric may comprise a Fibre Channel arbitrated loop configuration, a serial loop architecture or a bus interface, such as a Peripheral Component Interconnect (PCI) interface. Each processing complex 8a, 8b may be assigned a portion of the adaptors 22a, 22b . . . 22n, 24a, 24b . . . 24n and during initialization, the processing complexes 8a, 8b are responsible for initializing portions of the fabrics 30a, 30b providing communication paths to the adaptors that are assigned to that processing complex. For instance, if processing complex 8a is assigned adaptors 22a, 22b, 24a, 24b, then processing complex 8a would initialize and configure that portion of the fabric 30a, 30b providing communication paths between processing complex 8a and adaptors 22a, 22b, 24a, 24b. Likewise, if processing complex 8b is assigned adaptors 22n and 24n, then processing complex 8b would initialize and configure that portion of the fabric 30a, 30b and paths enabling communication between processing complex 8b and adaptors 22n and 24n. Configuring the fabrics 30a, 30b comprises setting registers in fabric hardware, e.g., the Fibre Channel loop hardware, serial loop architecture hardware or bus interface hardware, and performing other initialization and discovery related operations. Each individual adaptor 22a, 22b . . . 22n, 24a, 24b . . . 24n may be shared by the processing complexes 8a, 8b.

The supervisor modules 14a, 14b in connection with a hypervisor module 26a, 26b, maintain device/logical partition (LPAR) assignments identifying each assignment of the adaptors 22a, 22b . . . 22n, 24a, 24b . . . 24n to a logical partition 16a, 16b in each processing complex 8a, 8b, such that communication between a specific adaptor 22a, 22b . . . 22n, 24a, 24b . . . 24n and the processing complex 8a, 8b is handled by the device driver 20a, 20b executing in the logical partition 16a, 16b assigned to the specific adaptor 22a, 22b . . . 22n, 24a, 24b . . . 24n.

Each processing complex 8a, 8b may be on separate power boundaries. The processing complexes 8a, 8b may be assigned to handle I/O requests directed to specific volumes configured in the storage system 4. The processing complexes 8a, 8b communicate with the storage system 4, via the device adaptors 24a, 24b . . . 24n, over a device network (not shown), which may comprise a local area network (LAN), storage area network (SAN), bus interface, serial interface, etc. Further, the processing complexes 8a, 8b communicate over a connection 28 enabling processor inter-communication to manage configuring operations performed with respect to the shared devices, such as the shared adaptors 22a, 22b . . . 22n, 24a, 24b . . . 24n. In alternative embodiments, there may be only one fabric connecting all adaptors 22a, 22b . . . 24n, 24a, 24b . . . 24n, i.e., fabrics 30a and 30b may be part of a single interconnected fabric, or two fabrics 30a, 30b as shown, or more than two fabrics.

The cluster 6 may comprise any type of server, such as an enterprise storage server, storage controller, etc., or other device used to manage I/O requests to attached storage system(s) 4, where the storage systems may comprise one or more storage devices known in the art, such as interconnected hard disk drives (e.g., configured as a DASD, RAID, JBOD, etc.), magnetic tape, electronic memory, etc. The hosts 2 may communicate with the cluster 6, via the adaptors 22a, 22b . . . 22n, over a network (not shown), such as a Local Area Network (LAN); Storage Area Network (SAN), Wide Area Network (WAN), wireless network, etc. Alternatively, the hosts 2 may communicate with the cluster 6 over a bus interface, such as a Peripheral Component Interconnect (PCI) bus or serial interface. It is further appreciated that the cluster 6 may also be, for example, a generic server cluster, not just a storage subsystem or storage controller. For example, the two servers could be IBM pSeries servers running a highly available clustered application, such as Lotus Notes®.

Figure 2:
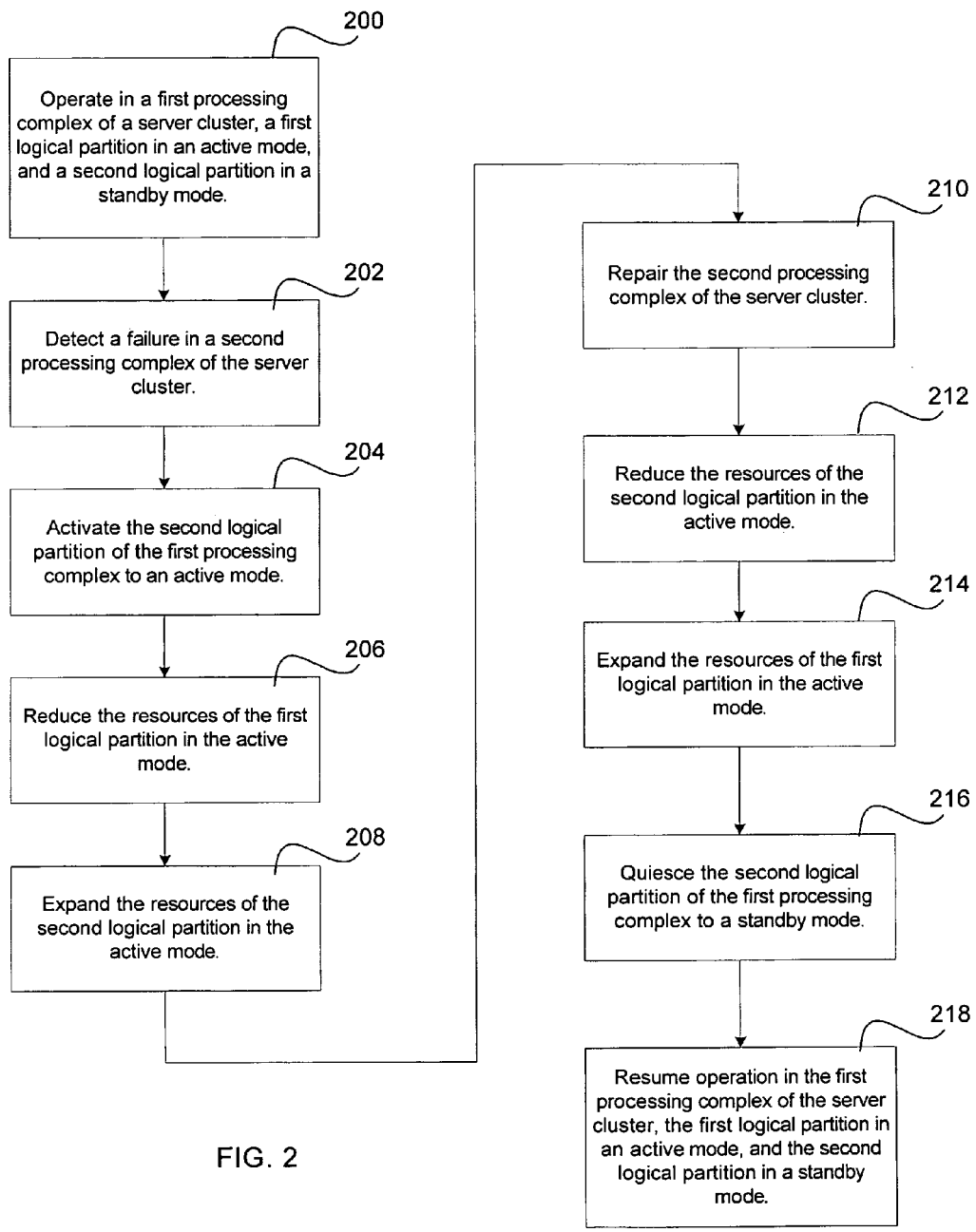
FIG. 2 illustrates one example of operations to handle a processing complex failure.
Figure 3:
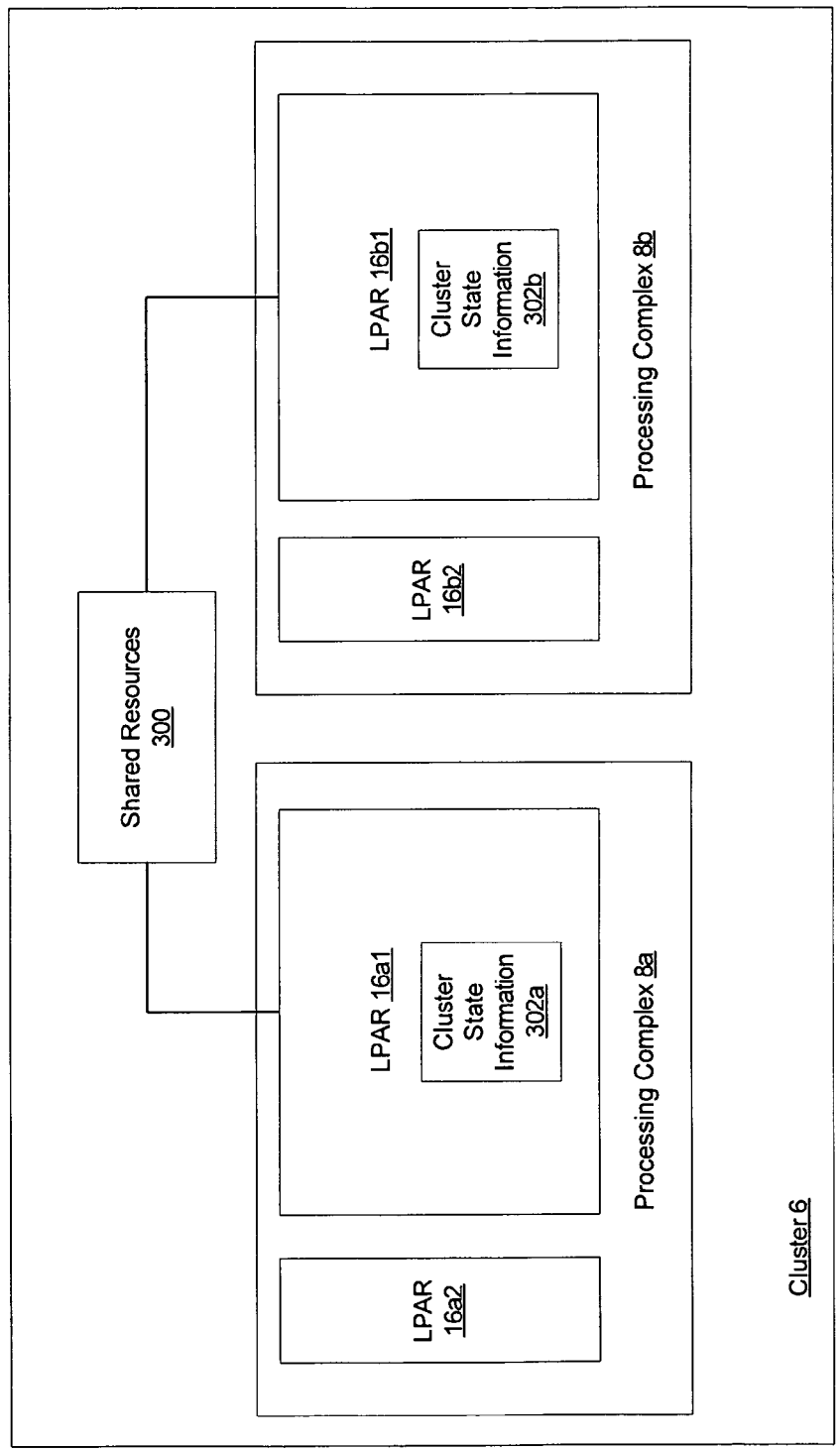
FIG. 3 is a schematic diagram of one example of a logical partition in a standby mode and a logical partition in an active mode.

In accordance with one aspect of the present description, FIG. 2 illustrates one example of operations of a cluster which increases redundancy in the event of a hardware or software failure. In one operation, the cluster operates (block 200) in a first node or processing complex of the cluster, a first logical partition in an active mode and a second logical partition in a standby mode. FIG. 3 is a diagram which schematically illustrates an example of the cluster 6 operating a first logical partition 16a1 of the processing complex 8a, in an active mode. In addition, a second logical partition 16a2 of the processing complex 8a is operated in a standby mode. Similarly, a first logical partition 16b1 of the processing complex 8b, may be operated in an active mode, and a second logical partition 16b2 of the processing complex 8b may be operated in a standby mode.

In the illustrated embodiment, in an active mode, the logical partitions 16a1, 16b1, perform input/output operations on behalf of a host 2. For example, an active mode logical partition 16a1 may read data from or write data to a storage system 4 as represented by the shared resources 300 of FIG. 3. Each active logical partition 16a1, 16b1 has access to additional shared resources 300 including the host adapters 22a, 22b . . . 22n to receive input/output tasks from a host 2. These input/output tasks and their associated input/output data are temporarily stored in memory assigned to the active mode logical partitions. Although the processing operations performed by the active logical partitions are described as input/output operations on behalf of a host 2, it is appreciated that the active logical partitions may perform other types of processing operations.

The logical partitions 16a1, 16b1 each have access to additional shared resources 300 including the device adaptors 24a, 24b . . . 24n to write output data from a host 2 to the storage system 4 and to receive from the storage system 4, read input data to forward to a host 2 in accordance with the particular input/output operations being performed. To perform these input/output operations or other processing operations, the active mode logical partitions are each assigned a substantial portion of the partition resources of associated processing complex 8a, 8b. Thus, for example, the active mode logical partition 16a1 may be assigned a majority of the CPU resources, memory resources and other dynamically assignable partition resources of the processing complex 8a. The percentage of the dynamically assignable partition resources assigned to any one active mode logical partition may depend upon the number of active mode and standby mode logical partitions in a processing complex and the relative workloads of each active mode logical partition.

By comparison, in the illustrated embodiment, in a standby mode, the logical partitions 16a2, 16b2, do not perform input/output operations on behalf of a host 2 and do not have access to the shared resources 300. Thus, for example, a standby mode logical partition 16a2 does not read data from or write data to the storage system 4 of shared resources 300 of FIG. 3. Each standby mode logical partition 16a2, 16b2 does not have access to the shared host adapters 22a, 22b . . . 22n since the standby mode logical partitions 16a2, 16b2 do not receive input/output tasks from a host 2. Thus, input/output tasks and their associated input/output data are not stored in memory assigned to the standby mode logical partitions.

Similarly, in the illustrated embodiment, the standby mode logical partitions 16a2, 16b2 do not have access to the device adaptors 24a, 24b . . . 24n of the shared resources 300 and do not write output data from a host 2 to the storage system 4. The standby mode logical partitions 16a2, 16b2 do not receive from the storage system 4, read input data to forward to a host 2.

In that the standby mode logical partitions do not, in this example, perform input/output operations, the standby mode logical partitions 16a2, 16b2 are each assigned a relatively small portion of the partition resources of associated processing complex 8a, 8b. Thus, for example, the active mode logical partition 16a1 may be assigned a single CPU (or a fraction of a single CPU), and a small amount of the memory resources and other dynamically assignable partition resources of the processing complex 8a as appropriate to maintain the standby mode. For example, a standby mode logical partition 16a2 may be assigned sufficient memory to maintain operation of an operating system but little or no additional operational memory may be needed.

In the illustrated embodiment, the active mode logical partition 16a1 maintains state information in a data structure 302a concerning the various states of the various state machines of the cluster 6. A synchronized copy of the cluster state information is similarly maintained by the active mode logical partition 16b1 in a data structure 302b. This state information facilitates control of the input/output operations or other processing operations being performed by the active logical partitions 16a1, 16b1 of the cluster 6 on behalf of a host 2. The active logical partitions 16a1, 16b1 may exchange state information between each other to facilitate each active partition maintaining current state information concerning cluster operations. In addition, the active mode logical partitions maintain data structures which facilitate performing the input/output operations in response to input/output tasks received from the hosts 2. These additional data structures maintained by an active mode logical partition include buffers, tables, memory regions, etc.

By comparison, the standby mode logical partitions 16a2, 16b2 do not perform I/O operations for a host 2 and do not maintain data structures concerning those I/O operations. The standby mode logical partitions 16a2, 16b2 do not exchange cluster state information with other logical partitions.

It is appreciated that, in some embodiments, the standby mode logical partitions 16a2, 16b2 may perform limited I/O operations and may have limited access to shared resources 300. In some embodiments, the standby mode logical partitions 16a2, 16b2 may maintain limited cluster state data structures and limited I/O operation data structures. The quantities of these limited amounts may vary, depending upon the particular application. However, in many embodiments, the operations undertaken or data structures maintained by the standby mode logical partitions 16a2, 16b2 may be substantially less than that of the active mode logical partitions.

In another operation, a failure in a second processing complex of the cluster is detected (block 202, FIG. 2). For example, the active mode logical partition 16a1 may detect that the processing complex 8b has failed as represented by the strike-through symbol 400 in FIG. 4. In one embodiment, the active mode logical partitions 16a1, 16b1 may periodically exchange messages, sometimes referred to as "heartbeats," to inform the other processing complex that it is operational. Should the active mode logical partition 16a1 fail to receive such a heartbeat message from the active mode logical partition 16b1, the logical partition 16a1 may infer that the processing complex 8b has suffered a failure. In the event of a failure by the other processing complex 8b, the surviving processor complex 8a may perform a failover in which the I/O operations not completed by the processor complex 8b would be taken over and completed by the surviving processor complex 8a. In addition, all new I/O operations from the host 2 would be performed by the processor complex 8a until the other processor complex 8b could be repaired and brought back on line.

With the processing complex 8b nonoperational, the cluster 6 may lack the redundancy which was provided by the processing complex 8b. Hence, a hardware or software failure in the surviving processing complex 8a may cause I/O operations in the cluster 6 to cease or may cause a loss of data.

In accordance with another aspect of the present description, the active mode logical partition 16a1 of the surviving processing complex 8a, may activate (block 204) a second logical partition, such as the standby mode logical partition 16a2, for example, of the surviving processor complex 8a, such that the logical partition 16a2 may be operated in active mode as well. As explained in greater detail below, activating a standby mode logical partition to active mode may provide an increased degree of redundancy. Thus, should a software failure occur, for example, in one of the active mode logical partitions 16a1, 16a2, operational software including data structures may be preserved in the surviving active mode logical partition of the surviving processor complex 8a.

In the illustrated embodiment, the active mode logical partition 16a1 may be made aware of a logical partition operating in a standby mode, such as the logical partition 16a2, by the logical partitions 16a1, 16a2 exchanging appropriate heartbeat messages. Upon detecting a failure of the other processing complex 8b, the active mode logical partition 16a1 can cause the standby mode logical partition 16a2 to activate itself to the active mode by sending a suitable message to the logical partition 16a2.

Figure 4:
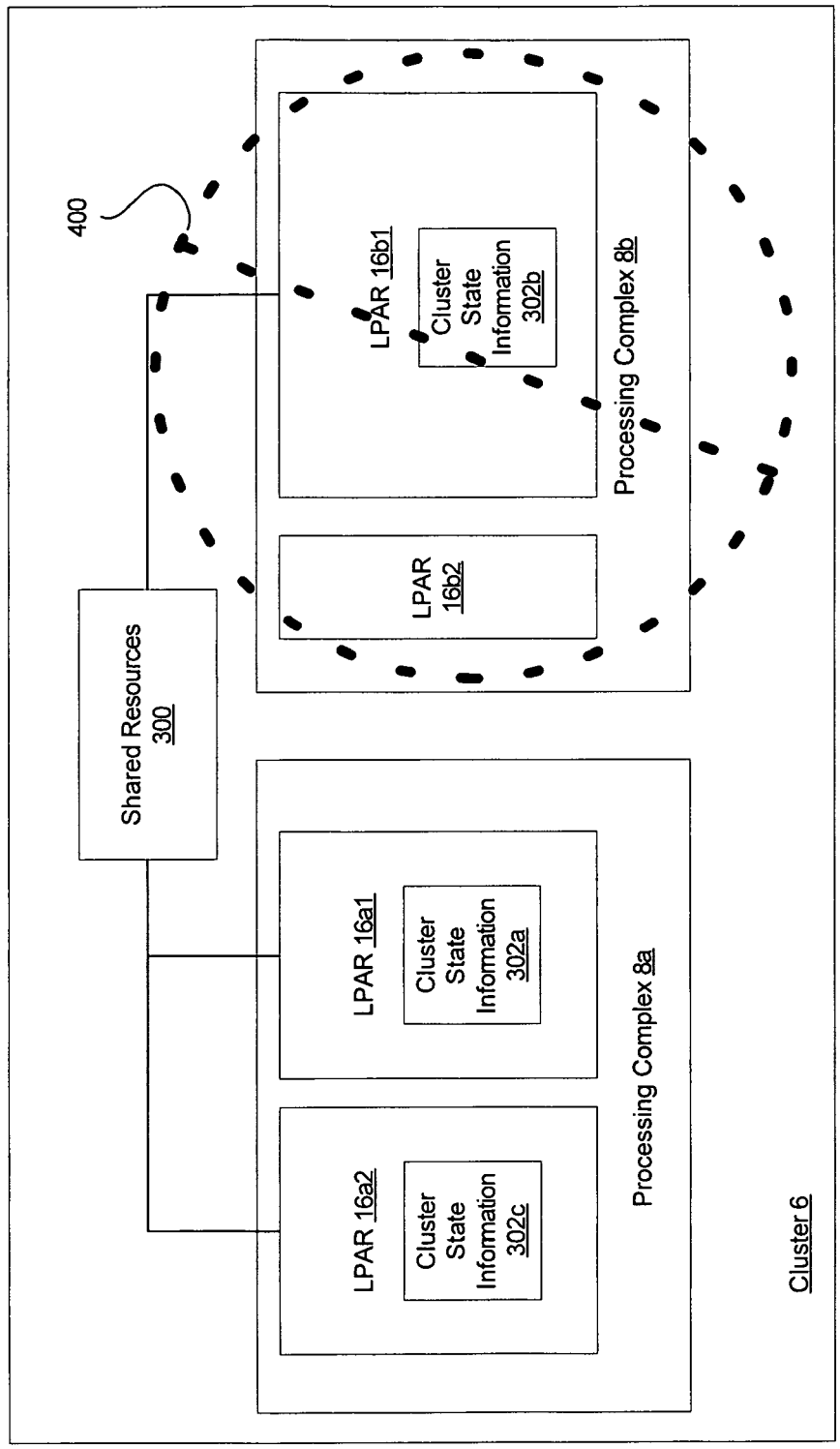
FIG. 4 is a schematic diagram of one example of a logical partition activated to an active mode from a standby mode and a logical partition in an active mode with reduced partition resources.

To switch from standby mode to active mode, the logical partition 16a2 may request from the active mode partition 16a1 a copy of the cluster state information 302a and begin to maintain its own synchronized copy of the cluster state information in a data structure 302c (FIG. 4). Additional information which the standby mode logical partition 16a2 may obtain from the active mode logical partition 16a1 includes lists of the hosts 2 which are not operational, and lists of the hosts 2 for which I/O operations are being performed by the cluster 6. The standby mode logical partition 16a2 may also obtain from the active mode logical partition 16a1 information for configuring the shared resources 300 including the host adaptors 22a, 22b . . . 22n and the device adaptors 24a, 24b . . . 24n.

Once the logical partition 16a2 has received synchronized copies of the appropriate information, the logical partition 16a2 can configure the shared resources 300 to permit use of the shared resources 300 by the logical partition 16a2. In addition, the logical partition 16a2 can maintain synchronized copies of the I/O operations data structures used in performing the I/O operations by the cluster 6. Once the logical partition 16a2 is ready to receive I/O operations from the hosts 2, it can become an active member of the cluster 6.

To facilitate operation of the logical partition 16a2 in an active mode, the partition resources of the other logical partition of the processing complex 8a, such as the logical partition 16a1, may be reduced (block 206) to make additional partition resources available for the logical partition 16a2 as it operates in the active mode. In the illustrated embodiment, dynamic redistribution of partition resources may be accomplished by the modules 14a, 26a as part of a failover to the active mode logical partition 16a1.

Thus, in this example, the active mode logical partition 16a1 upon detecting the failure of the other processing complex 8b, may transmit a message to the supervisor module 14a as part of the failover operation by which the active mode logical partition takes over the I/O operations which were previously performed by the processing complex 8b. In response, the supervisor module 14a can send a network request to the active mode logical partition 16a1 which "owns" a particular partition resource, asking the active mode logical partition 16a1 to release the particular partition resource and put it into a quiesced state. In this manner, a partition resource may be stopped, and placed under control of the hypervisor module 26a.

In another operation, the partition resources assigned to the logical partition being activated may be expanded (block 208). In this example, the supervisor module 26a can send a command to the hypervisor module 26a, instructing it to reallocate a quiesced partition resource from the active logical partition 16a1 to the logical partition 16a2 which is being activated from standby mode to active mode. In addition, the supervisor module 14a can send a network request to the logical partition 16a2, instructing it to acquire the quiesced partition resource from the hypervisor module 26a and configure it for use by the logical partition 16a2 transitioning to the active mode.

These operations of reducing the partition resources assigned to a logical partition such as the logical partition 16a1, and expanding the partition resources assigned to a logical partition transitioning to active mode, such as the logical partition 16a2, may be performed for as many partition resources as appropriate to balance the I/O workload between the logical partitions 16a1, 6a2, as appropriate. As the logical partition 16a2 gains partition resources such as additional processing and memory resources, for example, the amount of input/output or other processing operational workload which may be assumed by the logical partition 16a2 increases.

In one aspect of the present description, the logical partition 16a2 activated from a standby mode to an active mode of operation provides a degree of redundancy in the event of a failure. For example, if the logical partition 16a1 experiences a software failure, input/output operations by the cluster 6 may continue since the activated logical partition 16a2 has maintained synchronized copies of the data and data structures needed for input/output operations, including cluster state information, input/output operation data etc.

In another operation, the processing complex 8b which, in this example, experienced the initial failure, may be repaired (block 210). Once one or more logical partitions 16b1, 16b2 are returned to active mode and are capable of performing input/output operations for one or more hosts 2, one of the logical partitions 16a1, 16a2 of the processing complex 8a may be returned to standby mode. It is appreciated that a logical partition may be returned to standby mode for other purposes and in other circumstances.

To return a logical partition to standby mode, partition resources of that logical partition may be reduced (block 212). In this example, the logical partition 16a2 may be returned to standby mode. It is appreciated that in other applications, the logical partition 16a2 may remain in active mode and another logical partition such as the logical partition 16a1 may assume the standby mode.

In this example, the active mode logical partition 16a1 upon receiving data structure synchronization information and other communications from the processing complex 8b, indicating that one or more logical partitions 16b1, 16b2 are in active mode and are capable of conducting input/output operations for the hosts 2, a failback operation is performed, transferring input/output operations back to the processing complex 8b. In connection with the failback operation, the logical partition 16a1 may transmit a message to the supervisor module 14a. In response, the supervisor module 14a can send a network request to the active mode logical partition 16a2 which "owns" a particular partition resource, instructing the active mode logical partition 16a2 to release the particular partition resource and put it into a quiesced state. In this manner, a partition resource may be stopped, and placed under control of the hypervisor module 26a.

In another operation, the partition resources assigned to the remaining logical partition may be expanded (block 214). In this example, the supervisor module 26a can send a command to the hypervisor module 26a, instructing it to reallocate a quiesced partition resource from the logical partition 16a2 back to the logical partition 16a1 which will remain in the active mode. In addition, the supervisor module 14a can send a network request to the logical partition 16a1, instructing it to acquire the quiesced partition resource from the hypervisor module 26a and configure it for use by the logical partition 16a1.

These operations of reducing the partition resources assigned to a logical partition transitioning to standby mode, such as the logical partition 16a2, and expanding the partition resources assigned to the logical partition remaining in the active mode, such as the logical partition 16a1, may be performed for as many partition resources as appropriate for these respective modes. As the logical partition 16a1 gains partition resources such as processing and memory resources, for example, the amount of input/output or other processing operational workload which may be assumed by the logical partition 16a1 increases.

In another operation, the logical partition 16a2 may be quiesced (block 216) to the standby mode such that the logical partition 16a2 may be operated (block 218) in the standby mode and the logical partition 16a1 may be operated in the active mode. In this standby mode, the partition resources utilized by the logical partition 16a2 in the standby mode may be reduced to a minimum as noted above. Moreover, the operations to be performed by the logical partition 16a2 in a standby mode may be reduced or eliminated. One such minimum operation may include periodically issuing a heartbeat message to the active mode logical partitions such as the logical partition 16a1, informing the active mode logical partitions of the existence of the standby mode partition 16a2. It is appreciated that the amount of partition resources and operations assigned a logical partition in a standby mode may vary, depending upon the particular application.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The tangible medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process operations, method operations, algorithms or the like may be described in a sequential order, such processes, methods and algorithms may be configured to work in alternate orders. In other words, any sequence or order of operations that may be described does not necessarily indicate a requirement that the operations be performed in that order. The operations of processes described herein may be performed in any order practical. Further, some operations may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

In the described embodiments, the cluster 6 included two processing complexes 8a, 8b. In additional embodiments, there may be more than two systems accessing a shared device. In such embodiments, one or more of the processing complexes may maintain a logical partition in a standby mode and ready to be activated to provide redundancy in the event of a failure in another processing complex.

Certain embodiments may be directed to a method for deploying computing instruction by a person or automated processing integrating computer-readable code into a computing system, wherein the code in combination with the computing system is enabled to perform the operations of the described embodiments.

The illustrated operations of FIG. 2 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Certain operations have been described as occurring between logical partitions in a peer to peer manner. Other operations have been described as being accomplished with supervisory hardware or software. It is appreciated that operations may be accomplished either in a peer to peer approach or in a supervised approach or in a combination of approaches.

Processing operations being performed have been described as including input/output operations, for example. It is appreciated that other types of processing operations may be performed on behalf of a host or as a server.

A server cluster has been described above having two processing complexes, each of which having in regular operation an active mode logical partition and a standby mode logical partition. It is appreciated that in other embodiments, a server cluster may have a single processing complex or more than two processing complexes, and each processing complex may have more than one active or standby mode logical partition.

The foregoing description of various embodiments has been presented for the purposes of illustration and description. It is not intended to be exhaustive or to limit the description to the precise form disclosed. Many modifications and variations are possible in light of the above teaching.

What is claimed is:

1. A method, comprising:
   operating a first dynamic logical partition in a processor and a memory of a first processing complex of a server cluster in an active mode which includes operating an operating system and actively performing input/output operations between a host and a storage system, and a second dynamic logical partition in the processor and memory of the first processing complex in a quiesced standby mode which includes operating an operating system but is otherwise substantially inactive as compared to said active mode;
detecting a failure in a second processing complex of the server cluster;
in response to said failure detection, activating the standby dynamic logical partition in the first processing complex to operate in an active mode; and
subsequent to activating the second dynamic logical partition, dynamically transferring partition resources from the first dynamic logical partition to the second dynamic logical partition without rebooting the first processing complex.

2. The method of claim 1 further comprising:
repairing said second processing complex; and
in response to said repair, quiescing the second logical partition to operate in a standby mode.

3. The method of claim 1, further comprising:
dynamically reducing the partition resources of the first logical partition without rebooting the first processing complex; and
subsequent to activating the second logical partition, dynamically increasing the partition resources of the second logical partition without rebooting the first processing complex.

4. The method of claim 2, further comprising:
subsequent to the repair of the second processing complex, dynamically transferring partition resources from the second logical partition to the first logical partition without rebooting the first processing complex.

5. The method of claim 2, further comprising:
subsequent to the repair of the second processing complex, dynamically reducing the partition resources of the second logical partition without rebooting the first processing complex; and
dynamically increasing the partition resources of the first logical partition without rebooting the first processing complex.

6. The method of claim 1 further comprising:
repairing said second processing complex;
subsequent to the repair of the second processing complex, dynamically transferring partition resources from the second logical partition to the first logical partition without rebooting the first processing complex; and
quiescing the second logical partition to operate back in the standby mode.

7. The method of claim 1, wherein said active mode operating includes providing access to a shared resource for a logical partition operating in an active mode and wherein said standby mode operating includes denying access to said shared resource for a logical partition operating in a standby mode.

8. The method of claim 7 wherein said shared resource includes data storage disk drives.

9. The method of claim 1 wherein said dynamic partition resources include a processing portion of said processor, a memory portion of said memory and an input/output adapter, said portions and adapter each being capable of being dynamically assigned to said first dynamic logical partition and upon transfer, reassigned to said second dynamic logical partition without rebooting the first processing complex.

10. A method for deploying computing instructions, comprising:
integrating computer-readable code into a system, wherein the system has a server cluster having a first processing complex and a second processing complex, said first processing complex having a processor, a memory, a first dynamic logical partition having dynamic partition resources and operating in said processor and memory and a second dynamic logical partition operating in said processor and memory, and wherein the code in combination with the system is enabled to cause the system to perform:
operating said first dynamic logical partition in an active mode which includes operating an operating system and actively performing input/output operations between a host and a storage system, and said second dynamic logical partition in the processor and memory of the first processing complex in a quiesced standby mode which includes operating an operating system but is otherwise substantially inactive as compared to said active mode;
detecting a failure in said second processing complex;
in response to said failure detection, activating said second dynamic logical partition from said standby mode to operate in an active mode; and
subsequent to activating the second dynamic logical partition, dynamically transferring partition resources from the first dynamic logical partition to the second dynamic logical partition without rebooting the first processing complex.

11. The method of claim 10 and wherein the code in combination with the system is further enabled to cause the system to perform, in response to repair of the second processing complex, quiescing the second logical partition from the active mode to operate in a standby mode.

12. The method of claim 10, wherein said first logical partition has partition resources, and wherein the code in combination with the system is further enabled to cause the system to perform:
dynamically reducing the partition resources of the first logical partition without rebooting the first processing complex; and
subsequent to activation of the second logical partition, dynamically increasing the partition resources of the second logical partition without rebooting the first processing complex.

13. The method of claim 11, wherein said second logical partition has partition resources and wherein the code in combination with the system is further enabled to cause the system to perform, subsequent to the repair of the second processing complex, dynamically transferring partition resources from the second logical partition to the first logical partition without rebooting the first processing complex.

14. The method of claim 11, wherein said second logical partition has partition resources and wherein the code in combination with the system is further enabled to cause the system to perform:
subsequent to the repair of the second processing complex, dynamically reducing the partition resources of the second logical partition without rebooting the first processing complex; and
dynamically increasing the partition resources of the first logical partition without rebooting the first processing complex.

15. The method of claim 10 wherein said first logical partition has partition resources, and wherein the code in combination with the system is further enabled to cause the system to perform:
repairing said second processing complex;
subsequent to repair of the second processing complex, dynamically transferring partition resources from the second logical partition to the first logical partition without rebooting the first processing complex; and quiescing the second logical partition from the active mode to operate back in the standby mode.

16. The method of claim 10, wherein said first processing complex has shared resources and wherein said active mode operating includes providing access to a shared resource for a logical partition operating in an active mode and wherein said standby mode operating includes denying access to a shared resource for a logical partition operating in a standby mode.

17. The method of claim 16 wherein said shared resource includes data storage disk drives.

18. The method of claim 10 wherein said partition resources include a processing portion of said processor, a memory portion of said memory and an input/output adapter, said portions and adapter each being capable of being dynamically assigned to said first logical partition and upon transfer, dynamically reassigned to said second logical partition without rebooting the first processing complex.

\* \* \* \* \*